US012403799B2

United States Patent
Jung et al.

(10) Patent No.: US 12,403,799 B2
(45) Date of Patent: Sep. 2, 2025

(54) SUSPENSION DEVICE, BACKREST AND SEAT ARRANGEMENT

(71) Applicant: Adient US LLC, Plymouth, MI (US)

(72) Inventors: Thomas Jung, Aschbach (DE); Christian Markel, Alzey (DE); Ulf Schaeffling, Kaiserslautern (DE); Andreas Wiesemann, Kaiserslautern (DE)

(73) Assignee: Adient US LLC, Plymouth, MI (US)

( * ) Notice: Subject to any disclaimer, the term of this patent is extended or adjusted under 35 U.S.C. 154(b) by 422 days.

(21) Appl. No.: 18/057,302

(22) Filed: Nov. 21, 2022

(65) Prior Publication Data

US 2023/0173956 A1 Jun. 8, 2023

(30) Foreign Application Priority Data

Dec. 3, 2021 (DE) ..................... 10 2021 213 779.2
Apr. 8, 2022 (DE) ..................... 20 2022 203 556.9

(51) Int. Cl.
*B60N 2/30* (2006.01)
*B60N 2/20* (2006.01)
*B60N 2/22* (2006.01)

(52) U.S. Cl.
CPC ................. *B60N 2/22* (2013.01); *B60N 2/20* (2013.01); *B60N 2/3009* (2013.01); *B60N 2/3013* (2013.01); *B60N 2205/20* (2013.01); *B60N 2205/35* (2013.01)

(58) Field of Classification Search
CPC ........... B60N 2/20; B60N 2/3013; B60N 2/36
See application file for complete search history.

(56) References Cited

U.S. PATENT DOCUMENTS

| | | | | |
|---|---|---|---|---|
| 5,588,703 A | | 12/1996 | Itou | |
| 5,803,546 A | * | 9/1998 | Yamazaki | ................ A47C 7/60 297/331 |
| 7,722,120 B2 | * | 5/2010 | Toyooka | .................. B60N 2/22 297/354.1 |
| 8,360,529 B2 | * | 1/2013 | Armbruster | ............ B60N 2/686 297/285 |
| 8,899,679 B2 | * | 12/2014 | Edwards | .............. B60N 2/3013 297/354.1 |
| 11,110,828 B2 | * | 9/2021 | Pistilli | ...................... B60N 2/36 |
| 12,172,555 B2 | * | 12/2024 | Cherukuvada | ......... B60N 2/686 |

(Continued)

FOREIGN PATENT DOCUMENTS

| | | |
|---|---|---|
| CN | 102616160 A | 8/2012 |
| CN | 102673431 A | 9/2012 |

(Continued)

*Primary Examiner* — Timothy J Brindley
(74) *Attorney, Agent, or Firm* — Marshall & Melhorn, LLC

(57) ABSTRACT

A suspension device for a backrest for assisting an adjustment movement may have at least one spring element with a basic body and two end portions protruding from the basic body. The device also having a bearing element with a guide opening, and a counterbearing element with a receptacle. A first end portion is arranged in the receptacle and is mounted movably in a first direction relative to the counterbearing element. A second end portion may be arranged in the guide opening and may be mounted movably in a second direction relative to the bearing element. A backrest and a seat arrangement having the suspension device are also provided.

10 Claims, 14 Drawing Sheets

(56) References Cited

U.S. PATENT DOCUMENTS

| | | |
|---|---|---|
| 2014/0217767 A1 | 8/2014 | Heit et al. |
| 2014/0265505 A1* | 9/2014 | Li .......................... B60N 2/20 |
| | | 297/354.1 |
| 2016/0339810 A1 | 11/2016 | Pluta et al. |
| 2017/0355289 A1 | 12/2017 | Spangler et al. |
| 2018/0022240 A1* | 1/2018 | Dry ...................... B60N 2/3011 |
| | | 297/354.12 |
| 2018/0326882 A1* | 11/2018 | Bach ...................... B60N 2/844 |
| 2021/0129727 A1* | 5/2021 | Pistilli .................. B60N 2/3013 |

FOREIGN PATENT DOCUMENTS

| | | | | |
|---|---|---|---|---|
| CN | 109774554 A | 5/2019 | | |
| DE | 19906662 A1 | 9/2000 | | |
| DE | 102004054165 A1 * | 5/2006 | ............ | B60N 2/206 |
| DE | 102006051270 B3 | 5/2008 | | |
| DE | 102008024664 A1 * | 11/2009 | .............. | B60N 2/12 |
| DE | 102011079772 A1 | 4/2012 | | |
| DE | 102011013563 A1 | 9/2012 | | |
| DE | 102019213143 A1 | 3/2021 | | |
| EP | 2523826 A1 | 11/2012 | | |
| JP | H10157500 A | 6/1998 | | |
| WO | 2011086165 A1 | 7/2011 | | |
| WO | 2012038080 A1 | 3/2012 | | |

\* cited by examiner

SUSPENSION DEVICE, BACKREST AND SEAT ARRANGEMENT

FIELD

The invention relates to a suspension device for a backrest for assisting an adjustment movement. Furthermore, the invention relates to a backrest for a seat arrangement, in particular vehicle seat arrangement. Furthermore, the invention relates to a seat arrangement, in particular vehicle seat arrangement, with at least one seat part and a backrest of this type.

BACKGROUND

Backrests which are arranged movably on a seat part or on a plurality of seat parts are known from the prior art. Rear seat arrangements comprise, for example, a movable backrest or a plurality of movable and fixed backrests. For example, movable backrests are known in rear seat arrangements, with a trunk space being enlarged by folding the backrest. In view of the increasing demand for vehicles with improved seat systems for managing the trunk space in combination with passenger capacity while simultaneously maintaining or reducing an overall size, a weight and costs of the vehicle, it is desirable to provide the seat or a seat row or a seat bench of reduced complexity, improved trunk space capacity and improved flexibility when using an available trunk space.

Rear seat systems in vehicles typically comprise a seat part with a generally horizontal seat part and a generally vertical backrest part, which are pivotably connected. Such rear seat systems frequently provide a multiplicity of pivoting mechanisms, hinge mechanisms, locking mechanisms, sliding mechanisms and connecting mechanisms between the seat part and the backrest part and between the seat part and the vehicle floor, and therefore the seat part and the backrest part can be folded together in a multiplicity of orientations in order to improve the storage compartment capacity of the vehicle if the rear seats are unoccupied.

SUMMARY

It is the object of the invention to specify a novel suspension device for a backrest for assisting an adjustment movement. It is a further object of the present invention to specify a backrest for a seat arrangement, a seat row or a seat bench of a vehicle, the backrest being improved in relation to the prior art and also being simplified, reduced in the number of parts and being cost-effective. Furthermore, it is an object of the present invention to specify a seat arrangement for a vehicle with at least one seat part and a backrest.

In respect of the suspension device, the backrest, and the seat arrangement, the object is achieved according to the invention by the features of the claims.

The suspension device for a backrest for assisting an adjustment movement comprises at least one spring element with a basic body and two end portions, in particular protruding from said basic body, a bearing element with a guide opening, and a counterbearing element with a receptacle, wherein a first end portion is arranged in the receptacle and is mounted movably in a first direction relative to the counterbearing element, and wherein a second end portion is arranged in the guide opening and is mounted movably in a second direction relative to the bearing element.

The advantages achieved with the invention consist in providing a suspension device which is simple, is reduced in the number of parts and is cost-effective and which can easily be preassembled or finally assembled with just a few installation steps and can be integrated in a new or already existing seat system.

Furthermore, the suspension device according to the invention is designed in such a manner that, for the spring-assisted movement of the backrest, the spring element can easily be tensioned, in particular pretensioned. In particular, the spring element, the bearing element and the counterbearing element form a preassemblable or preassembled unit, wherein the spring element is in a relaxed state. For the tensioning, in particular pretensioning, of the spring arrangement, in particular of the spring element, it suffices to move, in particular to pretension, the spring element at one of its end portions in relation to the other end portion.

Owing to the fact that the spring element is mounted movably at its end portions in different directions, at least two pretensioning forces can be generated to assist an adjustment movement of the backrest. In this case, the tensioning, in particular pretensioning, is generated by changing a torque of the spring element. For the tensioning, in particular pretensioning, of the spring element, one of the end portions can be moved in relation to the other end portion and relative to the corresponding bearing element in such a manner that a torque is generated on the moving end portion, the torque being absorbed by the other end portion.

In a further embodiment, the first direction, in which the first end portion is movable, and the second direction, in which the second end portion is movable, differ from each other. For example, the first end portion is accommodated in the receptacle in a form-fitting manner in a direction perpendicular in relation to the first direction in order to absorb the torque on the second end portion. If the second end portion is moved in the second direction, in particular along the guide opening of the bearing element, this movement is released by the first end portion being moved in the first direction.

For example, the spring element is configured in a first pretensioned state in such a manner that the backrest is subjected to a first pretensioning force and moved from a comfort position, which is substantially perpendicular and/or is inclined to the rear, in the direction of a vehicle floor. For example, the first pretensioning force is used for accelerating the adjustment movement of the backrest. In this case, the backrest is moved by the first pretensioning force as far as a starting state of the spring element, in particular an inoperative position and/or a zero position in which the spring element is relaxed. If the backrest reaches the starting state of the spring arrangement, in particular of the spring element, a weight force of the backrest begins to act, and therefore the spring element leaves its starting state and is tensioned, in particular pretensioned, again. As a result, the spring element acts as a braking element and/or damping element. The spring element generates a second pretensioning force and acts counter to the weight force of the backrest. The spring arrangement is configured to provide two suspension functions. The spring arrangement is designed as a multi-function module. The spring arrangement is designed as a combined acceleration unit and damping unit.

A dual suspension and spring-assisted movement of the backrest is made possible by means of the suspension device.

In a further embodiment, the first end portion is mounted pivotably in the first direction, for example in the direction of a transverse extent and/or vertical extent of the counterbearing element, within the receptacle.

In a further embodiment, the second end portion is mounted displaceably in the second direction, for example in the direction of a vertical extent, of the bearing element along the guide opening.

In a further embodiment, in a starting state, in particular inoperative state, inoperative position and/or zero state, zero position, of the spring arrangement, the spring element is arranged in the guide opening of the bearing element in such a manner that the second end portion is arranged at a first angle relative to the bearing element, for example relative to a direction of vertical extent or corresponding vertical axis.

In a further embodiment, in a tensioned, in particular pretensioned, state of the spring arrangement, the spring element is arranged in the guide opening in such a manner that the second end portion is arranged at a second angle different from the first angle relative to the bearing element. This generates a torque which is absorbed by the other end portion or by the counterbearing element.

In a further embodiment, the suspension device comprises at least one adapter. The spring arrangement is mounted movably on the adapter. The spring arrangement is connected to the adapter. The adapter has at least one guide in which the second end portion of the spring element can be introduced or is introduced. The adapter is, for example, a central bearing element. The adapter is arranged, for example, on and/or in a vehicle structure. The adapter forms, for example, a bearing component which is fixed on the vehicle. The adapter can also be fastened to a seat frame and/or to a vehicle body, for example to a vehicle floor or chassis. The adapter is, for example, box-shaped and welded to the seat frame and/or to the vehicle structure. The adapter is formed, for example, from interconnected sheet metal parts and/or contour parts. The adapter can be arranged or is arranged outside the backrest.

The object is furthermore achieved according to the invention with a backrest for a seat arrangement, for example a seat row or seat bench, in particular a rear seat arrangement, wherein the backrest comprises at least one backrest supporting structure and a suspension device according to the previous description, wherein the preassembled spring arrangement is integrated in the backrest supporting structure, wherein the backrest supporting structure is spring-assisted, for example, in two directions, by means of the suspension device. A preassembled spring arrangement is understood as meaning in particular a separate installation unit or a structural unit which comprises all of the components preassembled with one another of the spring arrangement. By this means, the spring arrangement can be positioned in advance and mounted as a whole as an installation unit on the backrest supporting structure.

The spring arrangement is arranged, in particular inserted or insertable, as a preassembled unit or separate installation unit in a recess of the backrest supporting structure. The recess here is formed in the backrest supporting structure, in particular in a lower frame part, for example a lower transverse rod. The spring arrangement is finally mounted in the recess of the backrest supporting structure.

The backrest, together with the integrated spring arrangement as an installation unit is fastenable movably, in particular pivotably, to a seat part and/or to a vehicle floor adapter and/or to a vehicle structure adapter.

The backrest supporting structure is, for example, a backrest frame. The backrest supporting structure comprises, for example, at least one upper frame part, a lower frame part and two lateral frame parts connecting them. For example, the frame parts are designed as bars or rods. For example, at least the upper and/or lower frame part are/is of substantially U-shaped design. The lower frame part has a recess and/or opening which receives the spring arrangement.

The spring arrangement is integrated in the lower transverse rod.

The advantages achieved by the invention consist in particular in that a backrest of this type with an integrated spring arrangement can easily be transported and mounted. In addition, additional fastening elements or parts, which are connected fixedly to the backrest supporting structure, for holding suspension systems on the backrest supporting structure can be dispensed with. As a result, the comfort is also not impaired and no additional construction space is required. The spring arrangement is connected to the backrest supporting structure in a form-fitting and/or force-fitting and/or integrally bonded manner. The spring arrangement is accommodated, for example, in the recess in a force-fitting and/or form-fitting manner. The spring arrangement is therefore inserted into the recess and finally assembled.

The spring arrangement comprises at least one compensation spring.

The integrated spring arrangement is arranged in and/or on the backrest supporting structure in such a manner that, in the non-mounted state of the backrest, for example in a preassembly state or transport state of the backrest, the spring arrangement is kept relaxed in and/or on the backrest supporting structure. Only during installation with a seat arrangement, for example a seat part or an adapter, is the spring arrangement brought into an active state, in particular a pretensioned state. In other words: the suspension function of the spring arrangement is passive when the backrest is not mounted. A spring element, in particular the backrest compensation spring, of the spring arrangement is kept here relaxed in the backrest supporting structure. During and/or after the installation of the backrest, the suspension function is activated and the spring element, in particular the backrest compensation spring, of the spring arrangement is tensioned or pretensioned.

The backrest supporting structure is adjustable with spring assistance, after release, from one of the comfort positions, for example a sitting position and/or travel position, into a loading surface position, by the integrated spring arrangement. The release takes place, for example, manually or by remote release. The backrest supporting structure is adjustable twice with spring assistance between the positions mentioned. The first spring assistance brings about an, in particular accelerated, movement or adjustment of the backrest from a design position and/or a rearwardly inclined comfort position forwards, i.e. in the direction of the vehicle floor or a seat surface. The second spring assistance acts counter to a weight force of the backrest or a gravitation force. This avoids hard striking against the seat part or hard restoring. The spring arrangement is configured to damp or to brake, in particular to retard, a movement, in particular adjustment, of the backrest supporting structure, i.e. a backrest.

In a further embodiment, the spring arrangement is configured in such a manner that its suspension function acts in two directions. In the mounted state of the backrest on the seat arrangement, for example on a seat part and/or an adapter, the spring element is kept tensioned or pretensioned. In this case, the spring arrangement is further tensioned, for example during adjustment of the backrest in a first adjustment direction, for example from a sitting position into a rear comfort position. The tensioned spring arrangement will attempt to reset itself, and therefore a restoring moment for resetting the backrest is generated and the spring arrangement thus acts as a restoring spring if the backrest is adjusted or is intended to be adjusted from the rear comfort position back into the sitting position and/or into a loading floor position.

In addition, the spring arrangement can be further tensioned during an adjustment of the backrest in a second adjustment direction, in particular in an opposite direction from the first adjustment direction, for example from the sitting position into a loading surface position. The tensioned spring arrangement will attempt to reset itself again, and therefore a restoring moment for resetting the backrest is generated, wherein a spring force now acts counter to a weight force and damps or retards the adjustment movement of the backrest shortly before it reaches the seat surface.

During the adjustment of the backrest in the second adjustment direction, the spring element is relaxed until the spring element reaches a relaxed state, with an adjustment movement of the backrest being accelerated. In the relaxed state of the spring element, the loading surface position is not yet completely taken up. For example, the spring element takes up the relaxed state when the backrest reaches an intermediate position located before the sitting position.

Subsequently, the backrest is movable further, in particular tensionable further, counter to its spring force. As a result, the spring element acts as a damping element or retarding element. The tensioned spring arrangement will attempt to reset itself again, and therefore a restoring moment for resetting the backrest is generated. The backrest is, for example, not locked in the loading surface position. The restoring moment of the spring element acts counter to a weight force of the backrest, for example.

The spring element is, for example, a spring leg or a torsion bar spring.

The counterbearing element forms a counterbearing to the bearing element with the guide opening. The bearing element acts, for example, additionally as a covering element. In the mounted state of the spring arrangement in the backrest supporting structure, an opening of the recess for the introduction of the spring arrangement into the backrest supporting structure is covered by the bearing element or covering element. The counterbearing element is connected to one of the free end portions. For example, the counterbearing element is plugged on the free end portion, for example is pressed or pushed on said end portion. In other words: the free end portion of the spring element is plugged or fitted into a recess of the counterbearing element and connected to the bearing element in a force-fitting and/or form-fitting manner.

The bearing element is designed as a profiled covering. The end portion is guided through the guide opening. The guide opening is curved or in the form of a curve.

The suspension device can likewise be used for different vehicle components to be moved, for example a headrest.

DESCRIPTION OF THE FIGURES

Exemplary embodiments of the invention will be explained in more detail with reference to drawings, in which.

DETAILED DESCRIPTION

Mutually corresponding parts are provided with the same reference signs throughout the figures.

Figure 1:
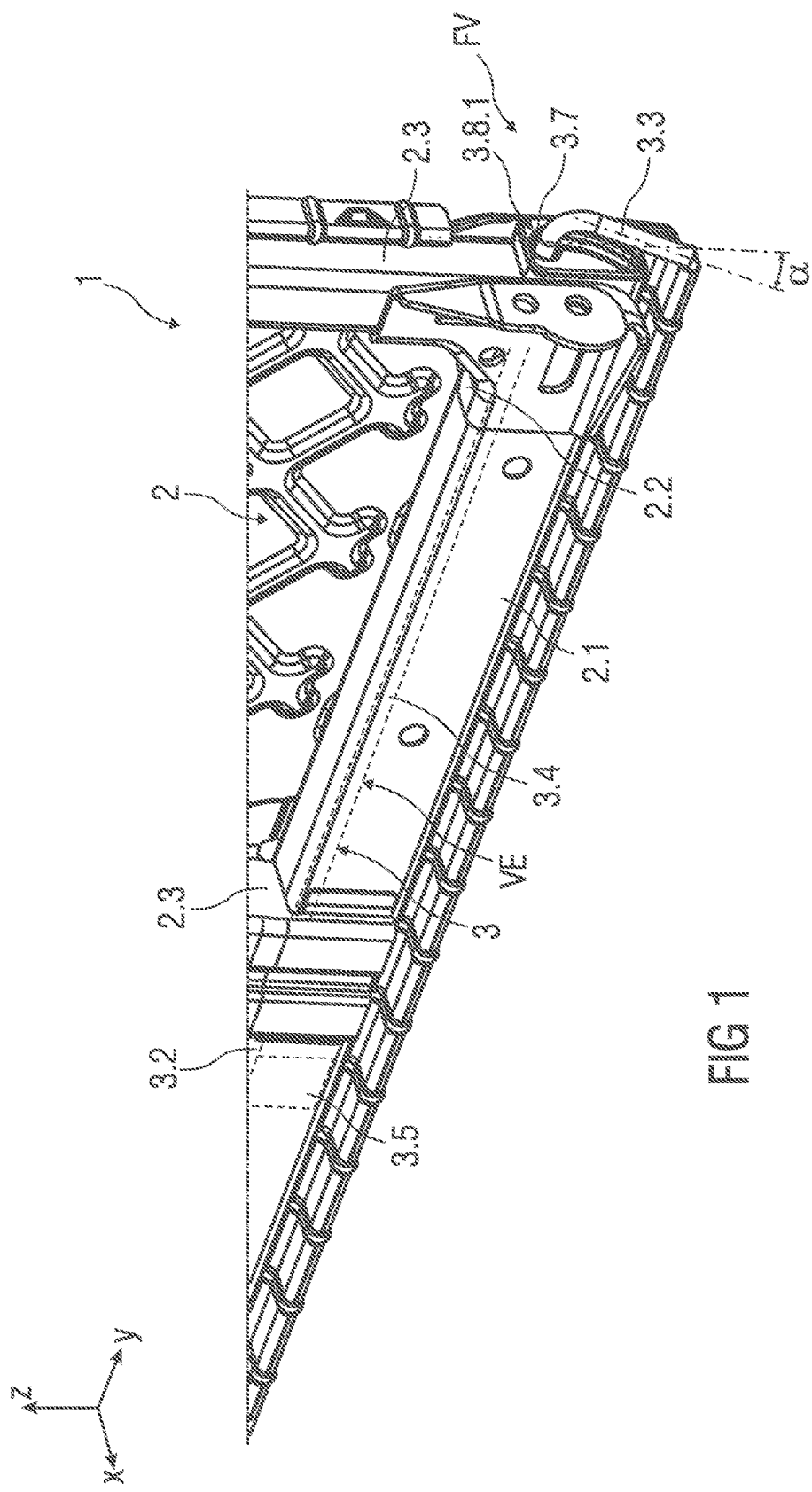
FIG. 1 shows, schematically in a perspective view, a backrest with a backrest supporting structure and an integrated spring arrangement of a suspension device.

FIG. 1 shows, schematically in a perspective view, a backrest 1 with a backrest supporting structure 2 and an integrated spring arrangement 3.

A vehicle seat S which is illustrated schematically in FIG. 4A will be described below using three spatial directions running perpendicularly to one another. With a vehicle seat S installed in the vehicle, a longitudinal direction X runs substantially horizontally and preferably parallel to a vehicle longitudinal direction which corresponds to the customary direction of travel of the vehicle. A transverse direction Y running perpendicularly to the longitudinal direction X is likewise oriented horizontally in the vehicle and runs parallel to a vehicle transverse direction. A vertical direction Z runs perpendicularly to the longitudinal direction X and perpendicularly to the transverse direction Y. With a vehicle seat S installed in the vehicle, the vertical direction Z preferably runs parallel to a vehicle vertical axis.

The position specifications and direction specifications used, such as, for example, front, rear, top and bottom, relate to a viewing direction of an occupant seated in the vehicle seat S in a normal sitting position, with the vehicle seat S being installed in the vehicle, and being oriented in a use position suitable for passenger transport, with an upright backrest 1 and in the direction of travel, as customary. However, the vehicle seat S may also be installed or moved in a different orientation, for example transversely with respect to the direction of travel.

The backrest 1 for a seat arrangement SA, for example a vehicle seat S (see FIGS. 4A to 4E), a seat row or seat bench, in particular a rear seat arrangement, comprises the at least one backrest supporting structure 2, in which a preassembled spring arrangement 3, using which the backrest supporting structure 2 is adjustable with spring assistance, for example, in two adjustment directions X1, X2 (shown schematically in FIGS. 4A to 5E).

The spring arrangement 3 is arranged as a preassembled unit VE in a recess 2.1 of the backrest supporting structure 2. The preassembled unit VE comprises at least one spring element 3.1, a bearing element 3.7 and a counterbearing element 3.5. The spring element 3.1, the bearing element 3.7 and the counterbearing element 3.5 are connected, in particular preassembled, to one another.

The preassembled spring arrangement 3 is part of a suspension device FV. The suspension device FV for the backrest 1 is designed for assisting an adjustment movement of the backrest 1. Accordingly, the suspension device FV comprises the spring element 3.1 with a basic body 3.4 and two end portions 3.2, 3.3, protruding in particular from said basic body 3.4, the bearing element 3.7 with a guide opening 3.8, and the counterbearing element 3.5 with a receptacle 3.6.

The backrest 1 together with an integrated spring arrangement 3 is fastenable movably as an installation unit on a seat part 4 (see FIGS. 4A to 4E) and/or on an adapter 5 (see FIGS. 5A to 5E), for example for connection to a vehicle floor.

The backrest supporting structure 2 is, for example, a backrest frame. The backrest supporting structure 2 comprises an upper frame part, not illustrated specifically, a lower frame part 2.2 and two lateral frame parts 2.3. The two lateral frame parts 2.3 connect the upper frame part and the lower frame part 2.2 and together form the backrest frame. For example, the frame parts 2.2, 2.3 are in the form of bars or rods. At least the upper frame part 2.2 is of substantially U-shaped design, for example. The lower frame part 2.2 comprises, for example, a steel profile or aluminium profile. The lower frame part 2.2 is formed, for example, from a profiled metal sheet.

The lower frame part 2.2 has the recess 2.1 which receives the spring arrangement 3. In particular, the spring arrangement 3 is integrated in the lower frame part 2.2. The recess is, for example, a cavity, an opening, a clearance or the like. The lower frame part 2.2 is designed, for example, in the form of a square profile. The bearing element 3.7 and counterbearing element 3.5 have shapes corresponding to the profile of the frame part 2.2.

The spring arrangement 3 comprises a spring element 3.1, for example what is referred to as a compensation spring, in particular a torsion bar spring. The spring element 3.1 has two free end portions 3.2, 3.3. In one embodiment, the free end portion 3.2 which, in the mounted state, is arranged, for example, within the frame part 2.2 is an end running rectilinearly. The opposite free end portion 3.3 which, in the mounted state, projects at least in regions out of the recess 2.1 of the frame part 2.2 projects at an angle α from a rectilinearly running basic body 3.4 of the spring element 3. For example, the end portion 3.3 projects substantially perpendicularly (with respect to a direction of transverse extent) from the basic body 3.4 and is directed downwards (with respect to a direction of longitudinal extent). The end portion 3.3 is present in the form of a curved end. In particular, the end portion 3.3 is curved in such a manner that, in the mounted state, it runs in a manner curved away forwards in the lower frame part 2.2.

The counterbearing element 3.5 is designed for example in the form of a bearing bushing. The counterbearing element 3.5 comprises at least one receptacle 3.6 in which the spring element 3.1 is fixed. The counterbearing element 3.5 is connected to one of the free end portions 3.2. For example, the counterbearing element 3.5 is plugged onto the free end portion 3.2, for example is pressed or pushed on said end portion 3.2. For example, the free end portion 3.2 is introduced into the receptacle 3.6 and clamped or clipped therein in a force-fitting and/or form-fitting manner. In other words: the free end portion 3.2 of the spring element 3.1 can be fixed in the longitudinal direction X in the receptacle 3.6 of the counterbearing element 3.5 and connected to the counterbearing element 3.5 in a force-fitting and/or form-fitting manner. The receptacle 3.6 is, for example, a recess or a groove. In the preassembled state, the spring element 3.1, for example in the region of the end portion 3.2, is arranged at the upper end 3.6.1 of the receptacle 3.6.

The bearing element 3.7 is additionally in the form of a covering element, in particular a profile covering. In the mounted state of the spring arrangement 3 in the backrest supporting structure 2, the bearing element 3.7 covers the recess 2.1, for example a lateral introduction opening of the recess 2.1.

The curved end portion 3.3 is mounted movably, in particular held in a guided manner, on the bearing element 3.7. The bearing element 3.7 comprises a guide opening 3.8, in particular a sliding guide, through which the curved end portion 3.3 is guided. The guide opening 3.8 has a curved profile. The guide opening 3.8 has, for example, a substantially L-shaped, C-shaped or J-shaped guide track or guide curve. In the preassembled state of the spring arrangement 3, the spring element 3.1 is arranged at the upper end 3.8.1 of the guide opening 3.8.

The counterbearing element 3.5 forms a counterbearing to the bearing element 3.7.

The counterbearing element 3.5 and the bearing element 3.7 are plastics parts. For example, the counterbearing element 3.5 and the bearing element 3.7 are formed from plastic, for example plastic material.

Figure 2:
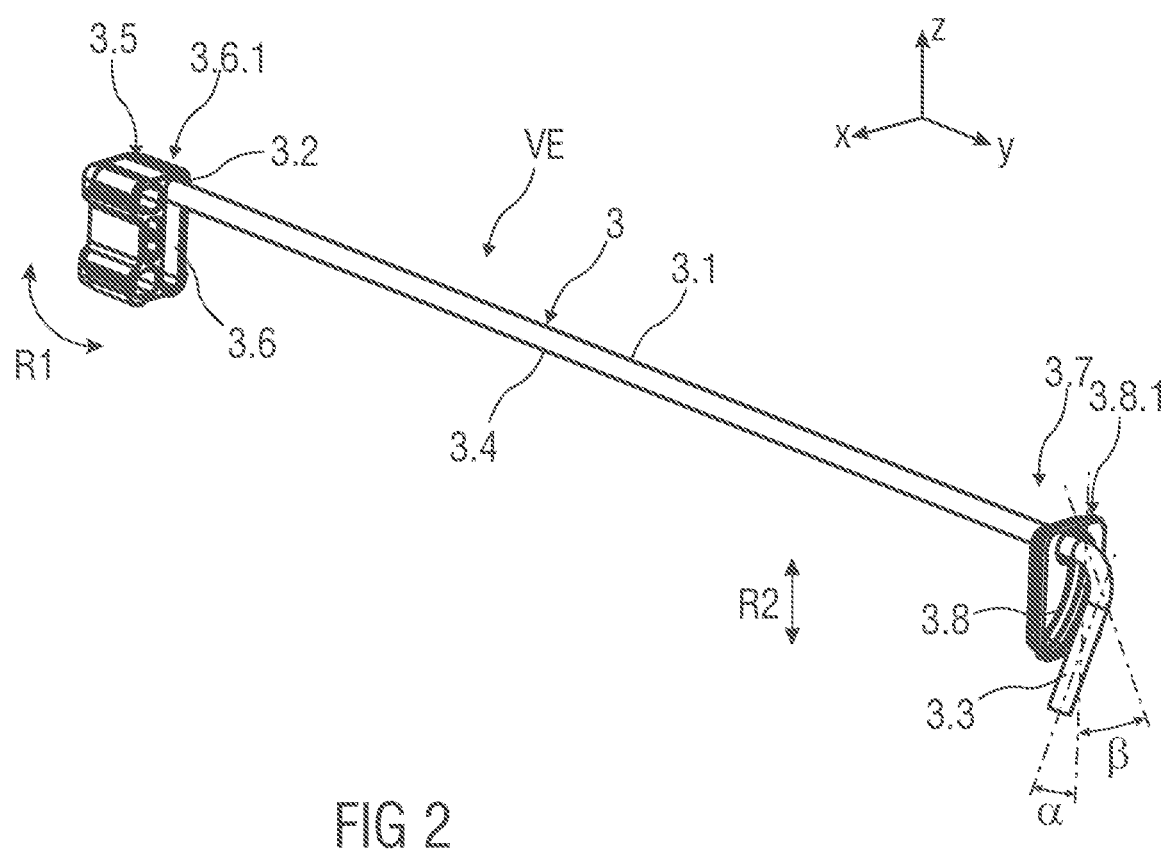
FIG. 2 shows, schematically, a preassembled spring arrangement of the suspension device, comprising a spring element, a bearing element and a covering element.

FIG. 2 shows, schematically, the preassembled spring arrangement 3 of the suspension device FV, comprising the spring element 3.1, the counterbearing element 3.5 and the bearing element 3.7. The spring element 3.1 is arranged here between the counterbearing element 3.5 and the bearing element 3.7 and fastened to them. The free end portion 3.2 of the spring element 3.1 is arranged in the receptacle 3.6 of the counterbearing element 3.5 and is connected to the counterbearing element 3.5 in a force-fitting and/or form-fitting manner at least in the longitudinal direction X. The curved end portion 3.3 is mounted movably, in particular held in a guided manner, on the bearing element 3.7. The curved end portion 3.3 is guided through the guide opening 3.8 of the bearing element 3.7 and mounted movably in the latter.

For example, the spring element 3.1 has two end portions 3.2, 3.3 protruding perpendicularly from the basic body 3.4. In particular, the first end portion 3.2 is arranged in the receptacle 3.6 and mounted movably in a first direction R1 relative to the counterbearing element 3.5. Furthermore, the second end portion 3.3 is arranged in the guide opening 3.8 and mounted movably in a second direction R2 relative to the bearing element 3.7.

In the starting state shown of the spring arrangement 3, the spring element 3.1 is arranged in the guide opening 3.8 of the bearing element 3.7 in such a manner that the second end portion 3.3 is arranged at the first angle α relative to an axis of vertical extent of the bearing element 3.7, wherein, in order to pretension the spring element 3.1, the second end portion 3.3 can be moved in a direction opposed to an orientation of the first angle α. In a pretensioned state of the spring arrangement 3, the spring element 3.1 is arranged in the guide opening 3.8 in such a manner that the second end portion 3.3 is arranged at a second angle β different from the first angle α relative to the bearing element 3.7.

The preassembled spring arrangement 3 is arranged in and/or on the backrest supporting structure 2 in such a manner that, in a non-mounted state of the backrest 1, the spring arrangement 3 is held in a relaxed state in and/or on the backrest supporting structure 2. Only upon installation with a seat arrangement SA, for example a seat part 4 or an adapter 5, is the spring arrangement 3 brought into an active state, in particular a pretensioned state. In other words: a suspension function of the spring arrangement 3 is passive in a non-mounted state of the backrest 1. In this case, the spring element 3.1 of the spring arrangement 3 is held in a relaxed state in the backrest supporting structure 2. During and/or after the installation of the backrest 1 comprising the spring arrangement 3 on the seat part 4 or on the adapter 5, the suspension function is activated and the spring element 3.1 tensioned or pretensioned.

Figure 3:
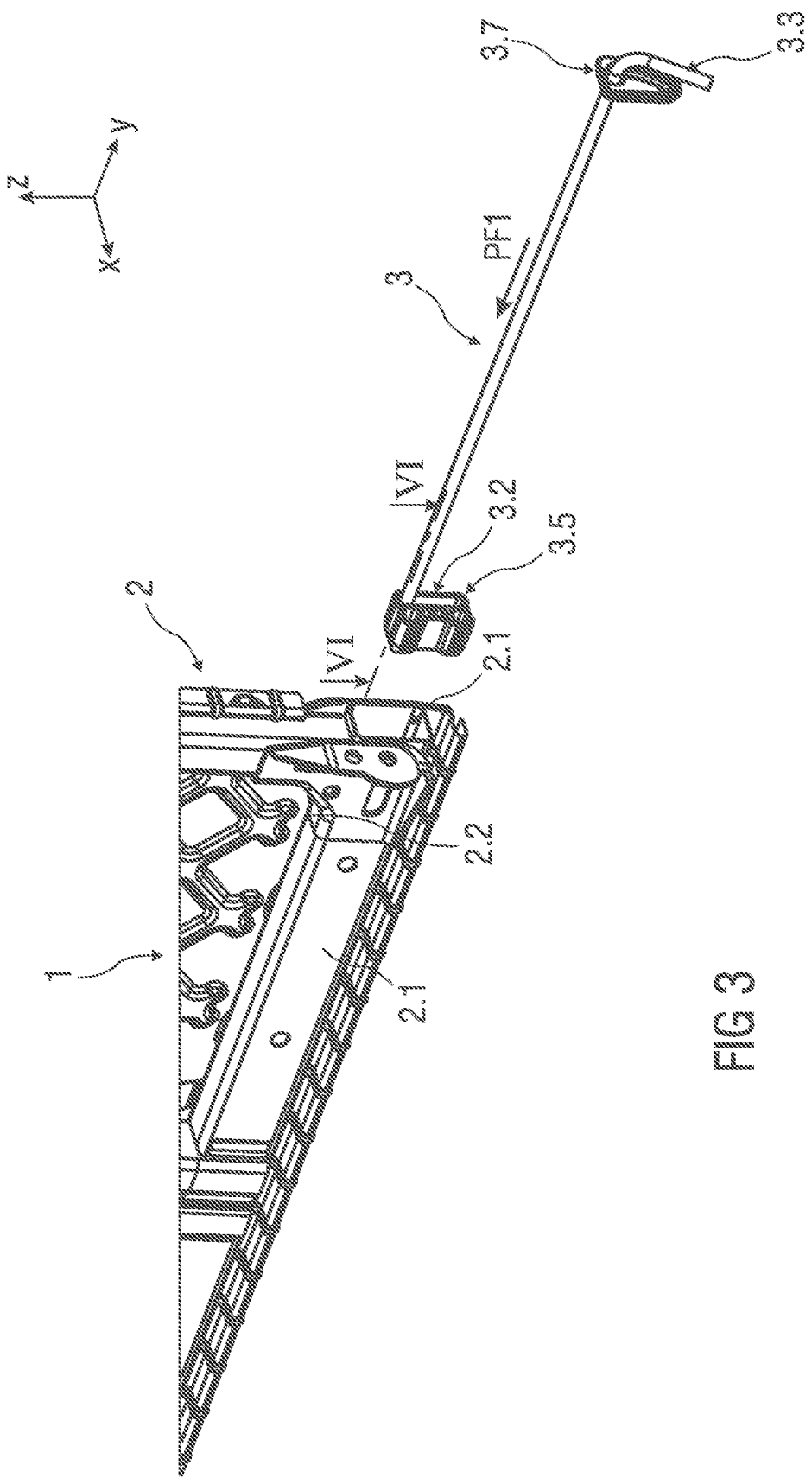
FIG. 3 shows, schematically in a perspective view, installation of the spring arrangement, arranged in the backrest supporting structure, and of the backrest supporting structure.

FIG. 3 shows, schematically in a perspective view, installation of the preassembled spring arrangement 3 and of the backrest supporting structure 2.

In order to install the preassembled spring arrangement 3 and the backrest supporting structure 2, the spring arrangement 3 is introduced laterally through the recess 2.1 and into the lower frame part 2.2. The introduction direction is indicated by an arrow PF1.

In a further embodiment, the spring arrangement 3 is configured in such a manner that its suspension function and/or restoring function acts in two directions, in particular in the adjustment directions X1, X2 illustrated in FIGS. 4A to 5E. A direction of action changes, for example, during the movement, in particular adjustment, of the backrest 1 or of the backrest supporting structure 2 relative to the seat part 4 and/or to the adapter 5 and/or to a vehicle floor. For example, the adapter 5 is arranged on the seat part 4. The adapter 5 can likewise be arranged on a vehicle floor. In the mounted state of the backrest 1 on the seat arrangement SA, the spring arrangement 3.1 is held in a tensioned state. In this case, the spring arrangement 3 is further tensioned, for example during adjustment of the backrest 1 in the first adjustment direction X1, for example from a sitting position PD (shown in FIGS. 4C, 5C) into a rear comfort position P4 (shown in FIGS. 4D, 5D). The tensioned spring arrangement 3 will attempt to reset itself from the rear comfort position P4 such that a restoring moment for resetting the backrest 1 is generated and the spring arrangement 3 thus acts as a restoring spring if the backrest 1 is moved back out of the rear comfort position P4 into the sitting position PD.

Figure 4A:
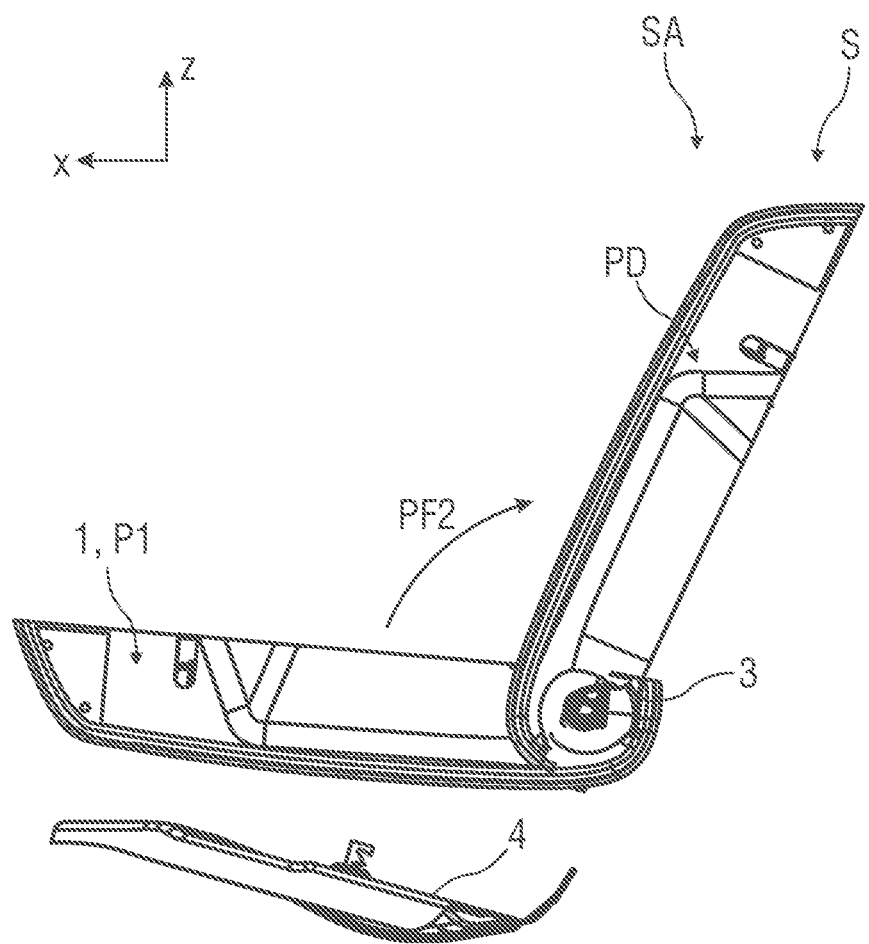
FIG. 4A shows, schematically in a side view, installation of the backrest on a seat arrangement.
Figure 4B:
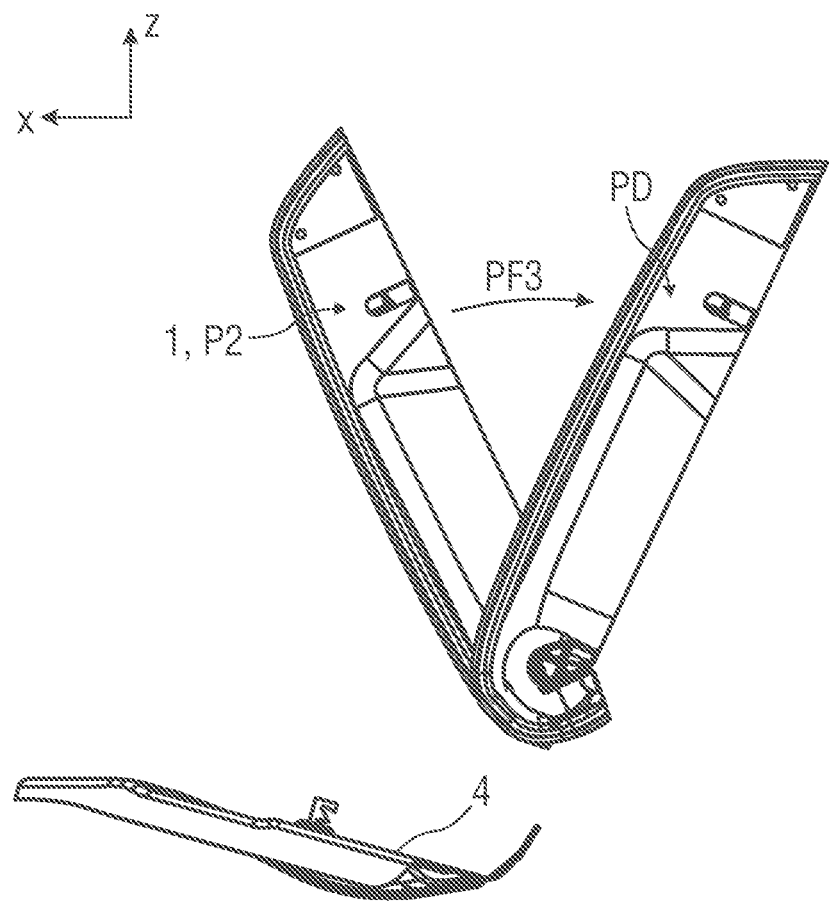
FIG. 4B shows, schematically in a side view, installation of the backrest on a seat arrangement.
Figure 4C:
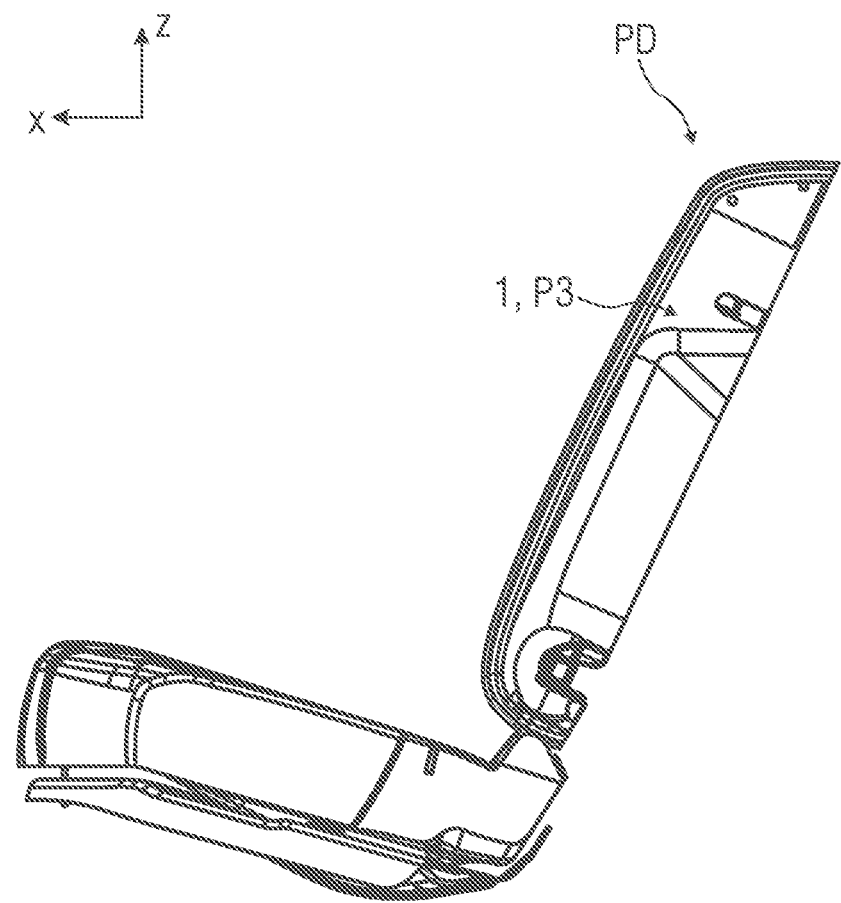
FIG. 4C shows, schematically in a side view, installation of the backrest on a seat arrangement.
Figure 4D:
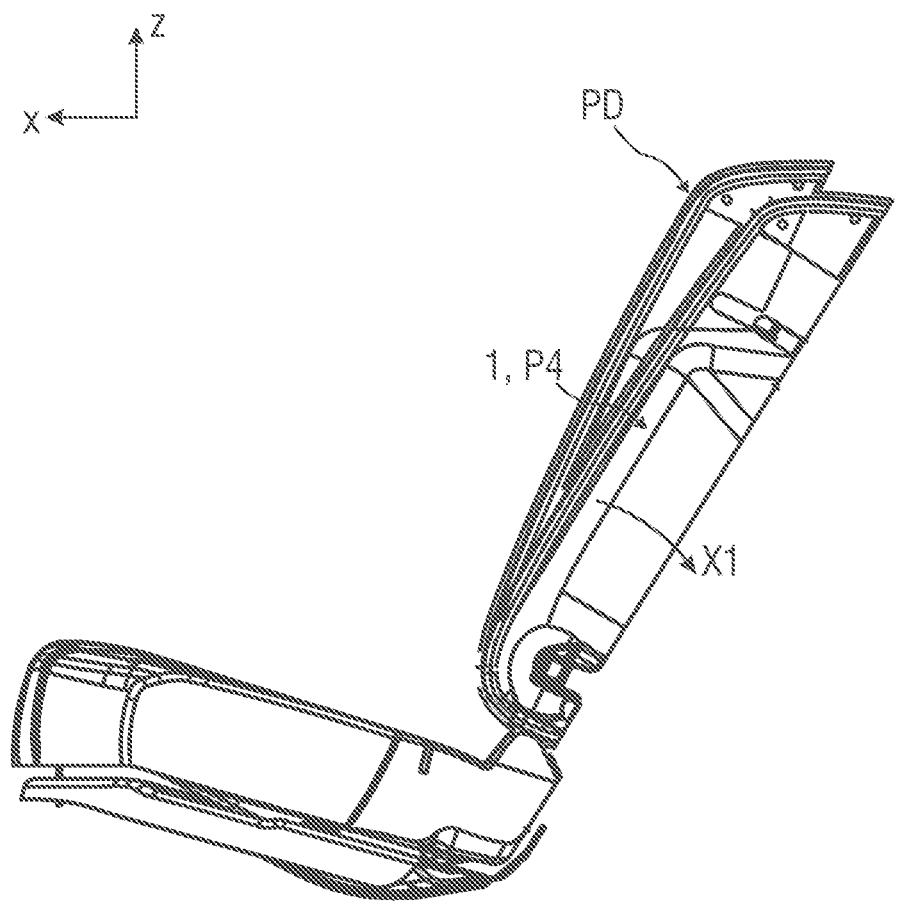
FIG. 4D shows, schematically in a side view, installation of the backrest on a seat arrangement.
Figure 4E:
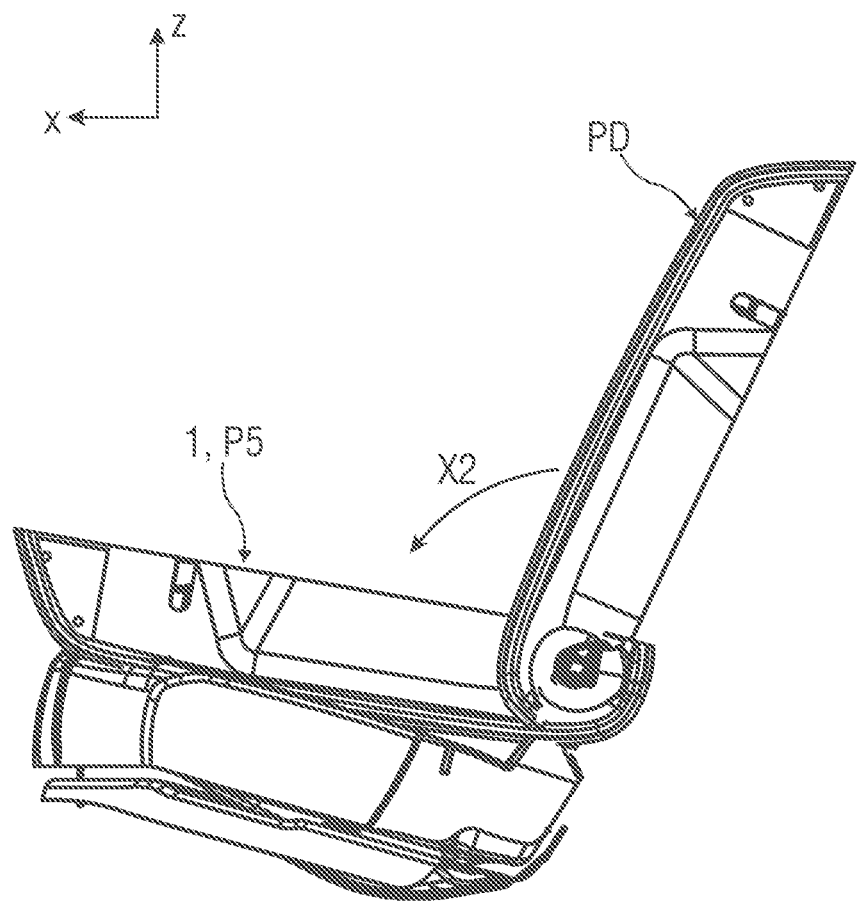
FIG. 4E shows, schematically in a side view, installation of the backrest on a seat arrangement.
Figure 5A:
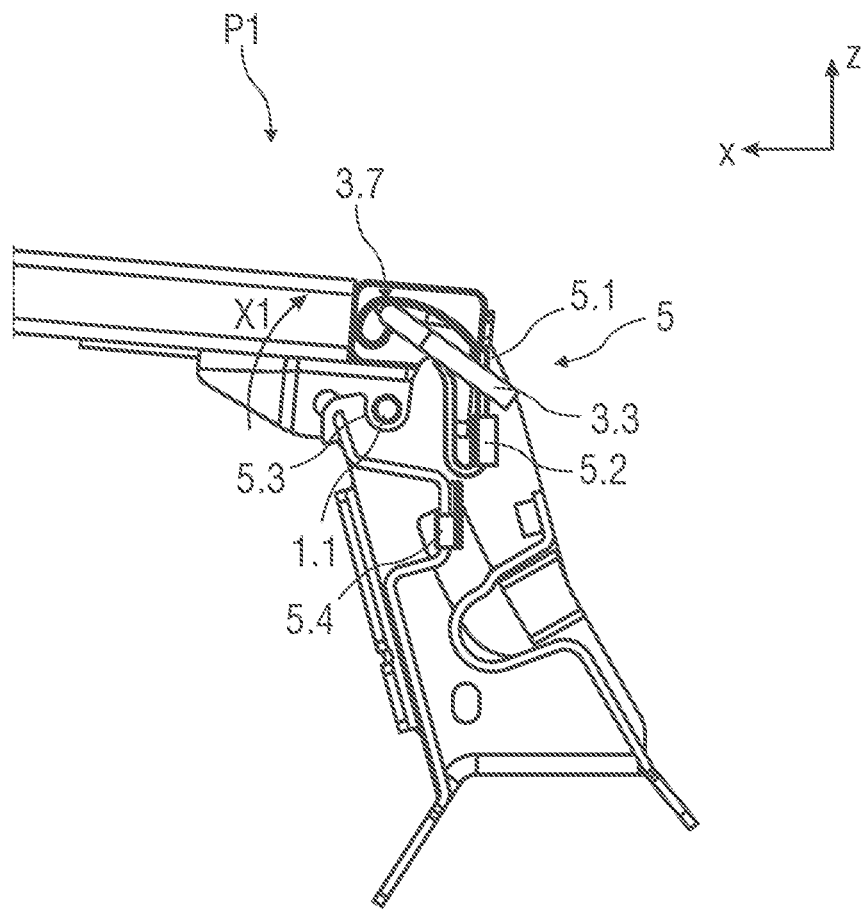
FIG. 5A shows, schematically in a side view, installation of the backrest on an adapter of a seat arrangement.
Figure 5B:
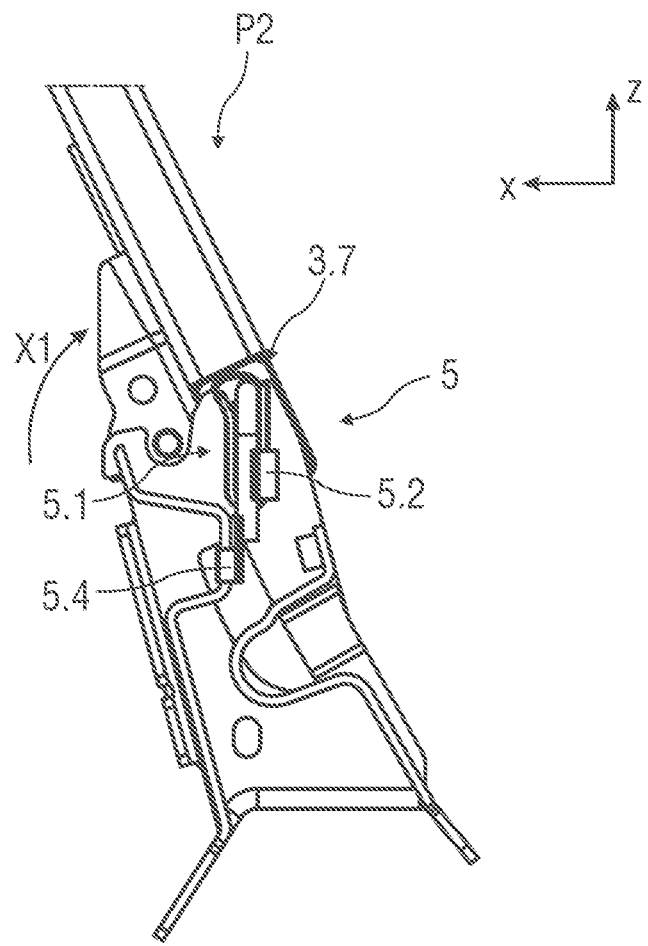
FIG. 5B shows, schematically in a side view, installation of the backrest on an adapter of a seat arrangement.
Figure 5C:
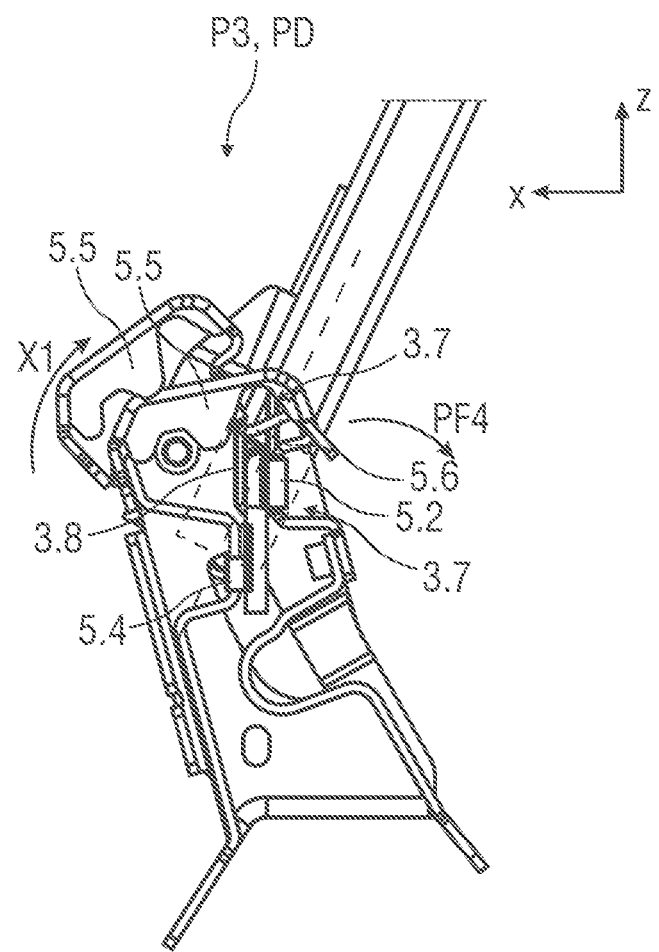
FIG. 5C shows, schematically in a side view, installation of the backrest on an adapter of a seat arrangement.
Figure 5D:
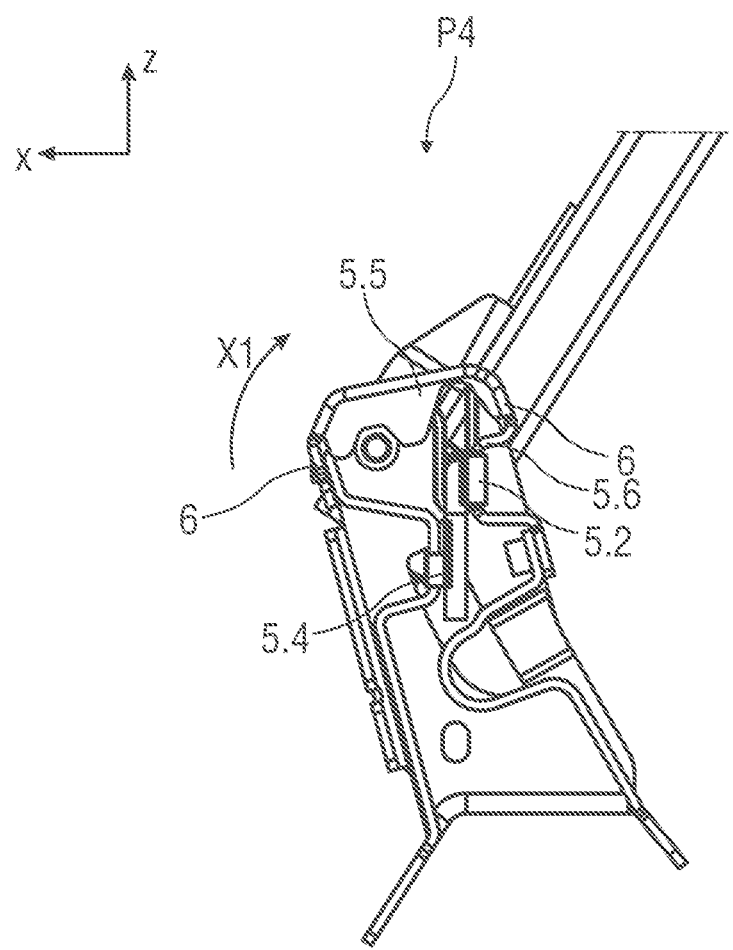
FIG. 5D shows, schematically in a side view, installation of the backrest on an adapter of a seat arrangement.
Figure 5E:
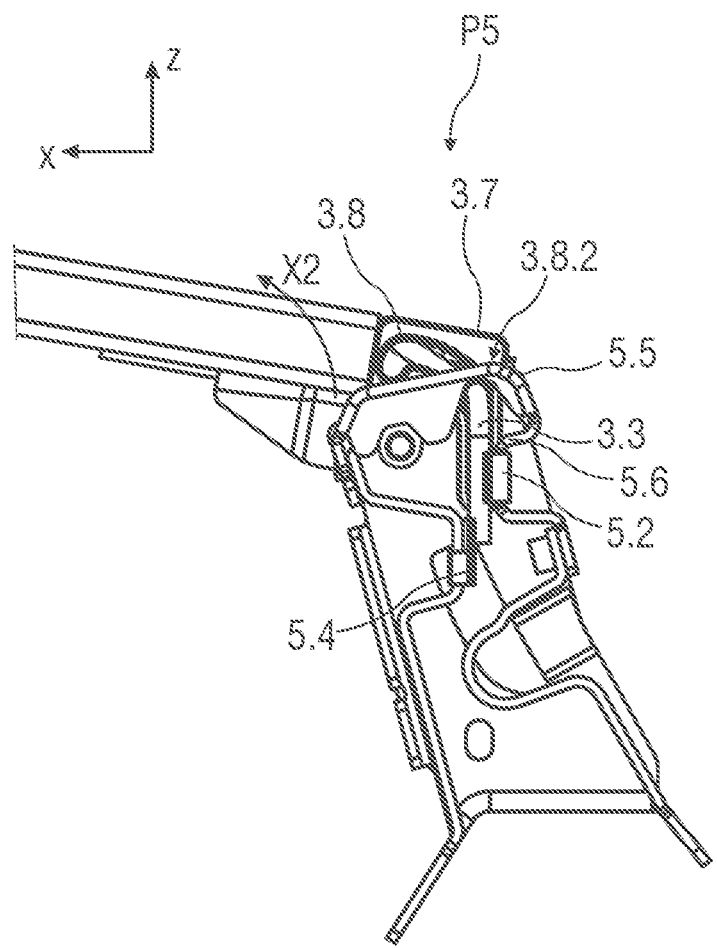
FIG. 5E shows, schematically in a side view, installation of the backrest on an adapter of a seat arrangement.

In addition, the spring arrangement 3 can be further tensioned during an adjustment of the backrest 1 in the second adjustment direction X2, in particular in an opposite direction to the first adjustment direction X1, for example from the sitting position PD into a loading surface position P5 (shown in FIGS. 4E, 5E). When the backrest 1 is released in order to adjust it from the sitting position PD into the loading surface position P5, the tensioned spring arrangement 3 will attempt to reset itself such that a restoring moment for resetting the backrest 1 is generated. The backrest 1 is adjustable automatically and in an accelerated manner in the direction of the loading surface position P5 as far as an intermediate position P2 (shown in FIGS. 4B, 5B) by a restoring force of the spring element 3.1. In other words: during the adjustment of the backrest 1 in the second adjustment direction X2, the spring element 3.1 is first of all relaxed until the backrest 1 reaches the intermediate position P2, in order subsequently to be further tensioned during a further adjustment of the backrest 1 going beyond the intermediate position P2. That is to say, in the intermediate position P2, the spring arrangement 3 reaches its starting state, for example its inoperative position or zero position. As a result, a damping force and/or braking force is generated. In the loading surface position P5, the backrest 1 is, for example, not locked. The restoring moment of the spring element 3.1 acts counter to a weight force of the backrest 1.

FIGS. 4A to 4E show, schematically in side view, installation of the backrest 1 on a seat arrangement SA with a seat part 4. The seat part 4 is, for example, a seat frame. The backrest 1 is mounted with an installed, in particular integrated, spring arrangement 3 and optionally additionally with a backrest cushion. The seat part 4 is cushion-free. Only after installation of the spring device FV, i.e. the backrest 1 on the adapter 5, is the seat part 4 provided with a cushion.

According to FIG. 4A, the backrest 1 is first of all preassembled in a position P1 folded forwards on the seat part 4. The position PD indicates a design position, in particular a sitting position or travel position. In the sitting position PD, the backrest 1 is arranged substantially perpendicularly to the seat part 4. In the installation position P1, the backrest 1 is, for example, folded away forwards from the sitting position PD by approximately 85°. The spring element 3.1 is held in a relaxed state in the backrest supporting structure 2. During the preassembly of the backrest 1 on the seat part 4, the spring element 3.1 is positioned in advance in a guide 5.1, shown more specifically in FIGS. 5A to 5E, of an adapter 5 arranged, for example, in the region of the seat part 4 or of a vehicle floor.

Subsequently, the backrest 1 is folded or adjusted from the installation position P1 in the direction of the sitting position PD according to arrow PF2 into an intermediate position P2 according to FIG. 4B. In the intermediate position P2, the backrest 1 is adjusted, for example, by approximately 20° to 60°, for example 50°, from the installation position P1 in the direction of the sitting position PD. By folding the backrest 1 from the installation position P1 into the intermediate position P2, the spring element 3.1 is further introduced into the guide 5.1 of the adapter 5. The spring element 3.1 remains relaxed.

Subsequently, the backrest 1 is folded or adjusted from the intermediate position P2 in the direction of the sitting position PD according to arrow PF3 into the final installation position P3.

In a final installation position P3 of the backrest 1 according to FIG. 4C, the spring element 3.1 is arranged completely in the guide 5.1 of the adapter 5 and is mounted rotatably therein. During the movement from the intermediate position P2 into the final installation position P3, which corresponds to the sitting position PD, the spring element 3.1 is rotated according to arrow PF4 in FIG. 5C. As a result, the spring element 3.1 is tensioned, in particular pretensioned. The spring element 3.1 is rotated, for example, by approximately 50° relative to its starting position and is under tension. The spring arrangement 3 is finally assembled and tensioned, in particular held in a pretensioned state, on the seat arrangement SA, in particular on the adapter 5. The final installation position P3 corresponds, for example, to the sitting position PD in which the backrest 1 is arranged folded rearward, for example, by 25° to a vertical axis.

In a comfort position P4 according to FIG. 4D, in which the backrest 1 has been adjusted or folded rearwards, for example, by 7° from the sitting position PD in the adjustment direction X1, the backrest 1 remains locked by a locking unit, not illustrated specifically, for example by an adjustable bolt mechanism. The spring element 3.1 is tensioned here, for example, by approximately +57°.

In a loading surface position P5 according to FIG. 4E, for example a storage position, of the backrest 1, in which the backrest 1 is arranged substantially horizontally over the seat part 4, the adjustment of the backrest 1 is retarded by the spring arrangement 3, in particular the pretensioned spring element 3.1. Upon release of the backrest 1 for adjustment of the latter from the sitting position PD into the loading surface position P5, the tensioned spring arrangement 3 will attempt to reset itself such that a restoring moment for resetting the backrest 1 is generated. The backrest 1 is adjustable automatically and in an accelerated manner in the direction of the loading surface position P5 as far as an intermediate position P2 by a restoring force of the spring element 3.1. In other words, during the adjustment of the backrest 1 in the second adjustment direction X2, the spring element 3.1 is first of all relaxed until the backrest 1 reaches the intermediate position P2, in order subsequently to be further tensioned during a further adjustment of the backrest 1 going beyond the intermediate position P2. As a result, a damping force and/or braking force is generated. For example, the backrest 1 is adjusted or folded forwards in the loading surface position P5 by approximately 105° from the sitting position PD in the adjustment direction X2. The spring element 3.1 is tensioned here, for example, by approximately −55°.

The abovementioned angle details should be understood merely as examples and serve for better understanding. The angle details can change depending on the configuration of the backrest 1 and/or of the seat arrangement SA and/or depending on vehicle properties, and so forth.

In an alternative embodiment, the backrest 1 can be locked in the loading surface position P5. For example, a backrest fitting, not illustrated specifically, can be provided with a locking system. Upon release of the backrest 1 which is in the loading surface position P5, the backrest 1 can be automatically raised in the direction of the intermediate position P2, for example, by the restoring moment of the spring element 3.1 and can be, for example, more simply grippable by a user.

FIGS. 5A to 5E show, schematically in side view, installation of the backrest 1 on an adapter 5 of a seat arrangement SA. FIG. 5A shows the backrest 1 in the installation position P1, FIG. 5B the backrest 1 in the intermediate installation position P2, FIG. 5C the backrest 1 in the final installation position P3, FIG. 5D the backrest 1 in the comfort position P4, and FIG. 5E the backrest 1 in the loading surface position P5. In the loading surface position P5, the spring element 3.1, in particular the second end portion 3.3, is arranged in the lower end 3.8.2 of the guide opening 3.8. The second end portion 3.3 makes contact with an inner surface, for example a contact surface, of the holding element 5.5, with the second end portion 3.3 coming into contact with the inner surface of the holding element 5.5. The holding element 5.5, or the inner surface, delimits a further movement path of the second end portion 3.3. For example, the holding element 5.5, or the inner surface, forms a stop.

The adapter 5 comprises a guide 5.1 which is open upwards. The adapter 5 comprises a first inner contact point 5.2, along which the spring element 3.1, in particular its curved end portion 3.3, is guided. The adapter 5 has a clearance 5.3 for the arrangement of a base element 1.1 of the backrest 1, wherein the backrest 1 is rotatable about the base element 1.1 in the adjustment directions X1, X2. The base element 1.1 is, for example, a bearing element, a support element or a supporting rod forming a bearing point or support point, in particular a pivot point, for the backrest 1.

In the installation position P1, the base element 1.1 is inserted into the clearance 5.3. The backrest 1 is aligned with the adapter 5. From the installation position P1, the backrest 1 is pivoted relative to the adapter 5 about an axis of rotation, which is defined by the base element 1.1, in the intermediate position P2.

From the intermediate position P2 and during further pivoting of the backrest 1, the spring element 3.1 is introduced into the guide 5.1 and moved downwards along the guide 5.1. The spring element 3.1 is moved, in particular pressed, downwards along the guide 5.1 by the bearing element 3.7. In the process, the curved end portion 3.3 makes contact with the first inner contact point 5.2 and a second contact point 5.4 formed on the guide 5.1. The spring element 3.1 is supported on both contact points 5.2, 5.4. Subsequently, the backrest 1 is adjusted from the intermediate position P2 into the final installation position P3, wherein the bearing element 3.7 makes contact by its upper end 3.8.1 of the guide opening 3.8 with the spring element 3.1 and moves further with the latter downwards along the guide 5.1.

In the final installation position P3, the curved end portion 3.3 of the spring element 3.1 is arranged and held in a tensioned state in the region of a lower closed end of the guide 5.1.

For the fixing of the backrest 1 to the adapter 5, in particular the spring arrangement 3 and the base element 1.1 to the adapter 5, the latter comprises a holding element 5.5 which is designed, for example, as a clamping element, a clamp element or clip element or as what is referred to as a hose clip. The holding element 5.5 is plugged onto the adapter 5 from above. The holding element 5.5 comprises a guide surface 5.6 for contacting and guiding the curved end portion 3.3 of the spring element 3.1. The holding element 5.5 and the adapter 5 are connected to each other by means of fastening elements 6, for example screw elements, hook elements, clip elements, rivet elements or adhesive bonding elements.

During an adjustment of the backrest 1 in the adjustment direction X1 (into the comfort position P4), the curved end portion 3.3 is moved downwards further along the guide 5.1 and along an additional sliding guide formed by the contact points 5.2, 5.4 and the guide surface 5.6 together, the spring element 3.1 being tensioned. As a result, the adjustment movement of the backrest 1 is damped and/or retarded.

During an adjustment of the backrest 1 in the adjustment direction X2 (into the loading surface position P5), the curved end portion 3.3 is moved upwards along the guide 5.1 and the additional sliding guide until the end portion 3.3 strikes against the holding element 5.5. Subsequently, the end portion 3.3 is movable along the guide opening 3.8. As a result, the adjustment movement of the backrest 1 is damped and/or retarded. When the loading surface position P5 is taken up, the spring element 3.1, for example, is tensioned.

Figure 6:
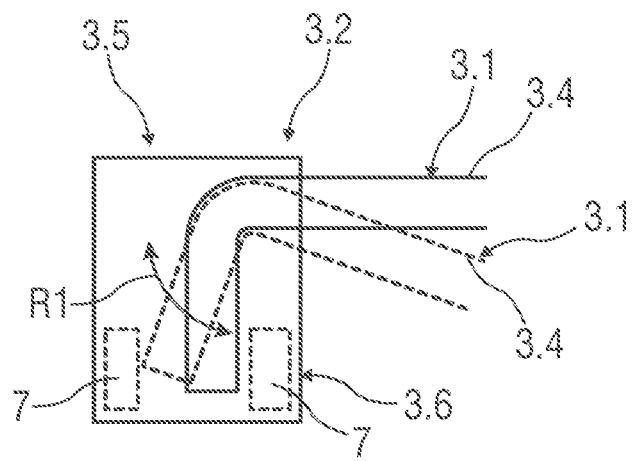
FIG. 6 shows, schematically in a sectional illustration, an embodiment of the spring arrangement of the suspension device.

FIG. 6 shows, schematically, a sectional illustration, as indicated in FIG. 3, of an embodiment of the spring arrangement 3 of the suspension device FV. The first end portion 3.2 of the spring element 3.1 is formed protruding substantially perpendicularly from the basic body 3.4. If the second end portion 3.3 is moved in a second direction R2 along the guide opening 3.8, the first end portion 3.2 pivots in the first direction R1. At an outer end of the receptacle 3.6, it is possible, for example, for a stop 7 to be arranged, for example in the form of a clamp element, clip element or block element. The stop 7 is designed to prevent the first end portion 3.2 from slipping out too far. If the second end portion 3.3 is arranged, for example, in the lower end 3.8.2 of the guide opening 3.8, the first end portion 3.2 enters into contact with the stop 7 and is blocked. Alternatively or optionally additionally, the receptacle 3.6 on a spring introduction side comprises a stop 7, for example in the form of a clamp element, clip element or block element. The stop 7 prevents, for example, the first end portion 3.2 from sliding out. During removal of the spring arrangement 3, the spring arrangement 3 is pulled out on the side of the bearing element 3.7, with the counterbearing element 3.5 being able to be pulled at the same time by contact of the first end portion 3.2 against the stop 7. This simplifies removal.

Figure 7:
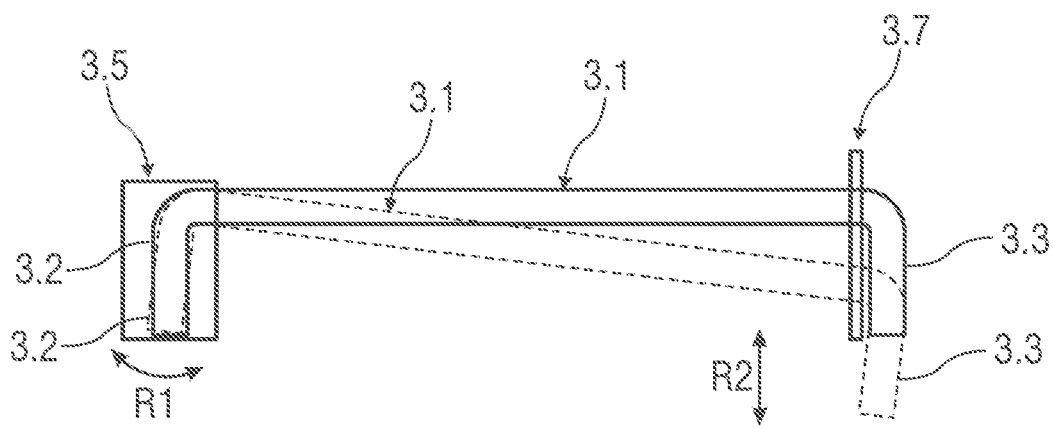
FIG. 7 shows, schematically, a movement sequence of the spring arrangement of the suspension device.

FIG. 7 shows, schematically, sequences of movement of the spring arrangement 3 of the suspension device FV. FIG. 7 shows pivoting of the first end portion 3.2 in a first direction R1 within the receptacle 3.6 depending on a displacement of the second end portion 3.3 in a second direction R2 along the guide opening 3.8. In particular, the first end portion 3.2 is pivoted in the direction of transverse extent relative to the counterbearing element 3.5. In one development, the first end portion 3.2 can be designed as a rectilinearly running end on the basic body 3.4. The second end portion 3.3 is displaced in the direction of the vertical extent of the bearing element 3.7, in particular is guided along the guide opening 3.8. A pretensioning of the spring element 3.1 can be generated by pivoting of the second end portion 3.3 and by changing a direction of the angle of the second end portion 3.3, with the torque being absorbed by the first end portion 3.2. The first end portion 3.2 is held blocked in the receptacle 3.6 during the change in the angle of the second end portion 3.2.

LIST OF REFERENCE SIGNS

1 Backrest
1.1 Base element
2 Backrest supporting structure
2.1 Recess
2.2, 2.3 Frame part
3 Spring arrangement
3.1 Spring element
3.2, 3.3 End portion
3.4 Basic body
3.5 Counterbearing element
3.6 Receptacle
3.6.1 End
3.7 Bearing element
3.8 Guide opening
3.8.1, 3.8.2 End
4 Seat part
5 Adapter
5.1 Guide
5.2 Contact point
5.3 Clearance
5.4 Contact point
5.5 Holding element
5.6 Guide surface
6 Fastening element
7 Stop
FV Suspension device
PD Position, for example design position, sitting position, travel position
P1 Position, for example installation position
P2 Intermediate position
P3 Final installation position
P4 Comfort position
P5 Loading surface position
PF1 to PF4 Arrow
R1, R2 Direction
S Vehicle seat
SA Seat arrangement
VE Preassembled unit
X Longitudinal direction
X1, X2 Adjustment direction
Y Transverse direction
Z Vertical direction
$\alpha$, $\beta$ Angle

What is claimed is:

1. A suspension device for a backrest for assisting an adjustment movement,
   wherein the suspension device comprises a spring arrangement, comprising:
   one spring element with a basic body and two end portions,
   a bearing element with a guide opening,
   at least one adapter, and
   a counterbearing element with a receptacle,
   wherein a first end portion is arranged in the receptacle and is mounted movably in a first direction relative to the counterbearing element, and
   wherein a second end portion is arranged in the guide opening and is mounted movably in a second direction relative to the bearing element, and
   wherein the spring arrangement is mounted movably on the at least one adapter, wherein the at least one adapter has at least one guide in which the second end portion of the spring element can be introduced or is introduced.

2. The suspension device according to claim 1, wherein the spring element, the bearing element and the counterbearing element form a preassemblable or preassembled unit, wherein the spring element is in a relaxed state.

3. The suspension device according to claim 1, wherein the first direction and the second direction differ from each other.

4. The suspension device according to claim 1,
   wherein the first end portion is mounted pivotably in the first direction within the receptacle, and
   wherein the second end portion is mounted displaceably in the second direction along the guide opening.

5. The suspension device according to claim 1, wherein, in a starting state of the spring arrangement, the spring element is arranged in the guide opening of the bearing element in such a manner that the second end portion is arranged at a first angle relative to the bearing element.

6. The suspension device according to claim 5, wherein, in a pretensioned state of the spring arrangement, the spring element is arranged in the guide opening in such a manner that the second end portion is arranged at a second angle different from the first angle relative to the bearing element.

7. A backrest for a seat arrangement, comprising at least one backrest supporting structure and a suspension drive according to claim 1.

8. The backrest according to claim 7, wherein the backrest supporting structure has at least one recess in which the spring arrangement of the suspension device can be arranged or is arranged.

9. A seat arrangement for a vehicle, comprising at least one seat part, and a backrest, which is pivotable relative to the seat part, according to claim 8.

10. The suspension device according to claim 1, wherein the two end portions protrude from the basic body.

* * * * *